United States Patent [19]

Nakanishi

[11] Patent Number: 4,934,843
[45] Date of Patent: Jun. 19, 1990

[54] ROTARY STRUCTURE

[75] Inventor: Tsutomu Nakanishi, Kunitachi, Japan

[73] Assignee: C.S.U. Ltd, Tokyo, Japan

[21] Appl. No.: 377,727

[22] Filed: Jul. 10, 1989

Related U.S. Application Data

[63] Continuation of Ser. No. 21,312, Mar. 3, 1987, abandoned.

[30] Foreign Application Priority Data

Mar. 7, 1989 [JP] Japan ................... 61-32633

[51] Int. Cl.⁵ ............................................... F16C 33/58
[52] U.S. Cl. ..................................... 384/613; 384/512; 384/514; 384/604; 384/615
[58] Field of Search ............... 384/515, 514, 604, 607, 384/613, 615, 512, 513, 545

[56] References Cited

U.S. PATENT DOCUMENTS

| | | | |
|---|---|---|---|
| 709,441 | 9/1902 | Henderson | 384/551 |
| 2,510,659 | 6/1950 | Ristow | 384/512 |
| 3,967,856 | 7/1976 | Beauchet | 384/545 |
| 4,605,321 | 8/1986 | Brandenstein et al. | 384/512 |

Primary Examiner—Lenard A. Footland
Attorney, Agent, or Firm—Ladas & Parry

[57] ABSTRACT

This invention relates to a rotary structure adapted to be used for a spindle unit of a miniature motor or miniature rotor or for a tape guide roller of a VTR or the like. In the structure of the rotary mechanism, instead of the conventional expensive radial ball bearings, recessed step parts are formed in the shaft itself and balls are held by and between the recessed step parts and ball receiving surfaces formed as tapered surfaces surfaces on outer races provided around the periphery of the shaft.

17 Claims, 8 Drawing Sheets

ROTARY STRUCTURE

This is a continuation on application Ser. No. 021,312 filed 3/3/87 now abandoned.

BACKGROUND OF THE INVENTION

A spindle unit used for a miniature motor or miniature rotor is conventionally formed as shown in FIG. 15.

That is to say, a pair of radial ball bearings 21 and 22 are arranged above and below on the outer periphery of a shaft 20, a cylindrical spacer 23 is arranged between outer races 21a and 22a of these radial ball bearings 21 and 22 to position the radial ball bearings 21 and 22 with each other, these members are fixed within a hole H of a bearing housing 24, such rotor 25 as a pulley, disc or turntable is fixed to the end of the shaft 20 and the shaft 20 side has been made rotatable.

The rotary mechanism of such roller as a conventional tape guide roller has been formed also of the same radial ball bearings.

However, in the above mentioned construction, sealing members S are arranged on both sides of balls 21c provided within the radial ball bearings 21 and 22 in order to prevent dust or the like from entering the radial ball bearings 21 and 22 and reducing the performance of the rotary mechanism, that is, a so-called double sealing structure is used. These radial ball bearings 21 and 22 are deficient in that the component parts are many, the assembly is complicated and the cost is high.

There is also the disadvantage that the clearance (in four places) of the radial ball bearings 21 and 22 cause a rotary vibration of the shaft 20.

SUMMARY OF THE INVENTION

This invention seeks to solve the above mentioned disadvantages.

An object of the present invention is to provide a rotary structure wherein the construction of the radial ball bearing part is simplified, the producing and assembling operations are also made easy and the cost is reduced.

Another object of the present invention is to provide a rotary structure wherein the inner race and shaft are made integral with each other, the construction is made small, the weight is reduced, the ball diameter can be made larger than before and the rigidity is improved.

A further object of the present invention is to provide a rotary structure wherein clearance can be easily adjusted by finely adjusting the position of the outer race in assembling and the precision is improved.

DESCRIPTION OF THE PREFERRED EMBODIMENTS

Figure 1:
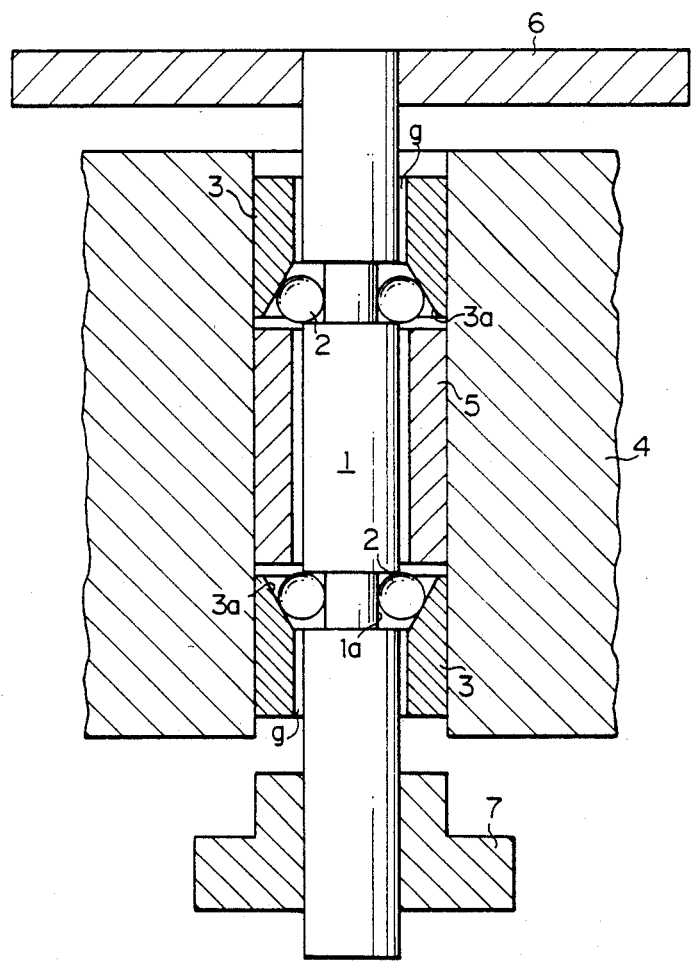
FIG. 1 is a schematic vertically sectioned view of the first embodiment of the present invention.

FIG. 1 shows the first embodiment of the present invention in which a pair of ball receiving parts 1a consisting of recessed grooves substantially rectangular in the cross-section formed by cutting or grinding over the entire periphery on the upper and lower parts of the outer periphery of a columnar shaft 1 are separated from each other and several spherical balls 2 are partly received in contact with the outer peripheral surfaces of these ball receiving parts 1a and the axial inside surfaces.

The respective balls 2 are supported also by substantially cylindrical outer races 3 provided around the outer periphery of the shaft 1. That is to say, the outer races 3 are respectively provided in the positions outside the respective balls 2 around the outer periphery of the shaft 1 and have tapered surfaces 3a contacting, pressing and holding the balls 2 formed at the inner ends. The tapered surface 3a of the outer race 3 is so formed as to successively expand in the inside diameter toward the inside and the inner peripheral surface 3b of the outer part of the outer race 3 is not in contact with the outer peripheral surface 1b of the shaft 1 to form a dust preventing clearance g. A bearing housing 4 is provided on the outer periphery of the outer race 3 and the outer peripheral surface of the outer race 3 is fixed to the inner peripheral surface of bearing housing 4. A cylindrical sleeve 5 is provided between the pair of outer races 3 separated from each other to prevent the balls 2 from escaping and dropping in assembling, is fixed on the outer peripheral surface of the inner peripheral surface of the bearing housing 4, is located at the respective outer ends near the balls 2 and is not in contact with the outer races 3, balls 2 and shaft 1. In some cases, the sleeve 5 can be fitted to the shaft 1. The respective outer races 3 are also fixed to the inner peripheral surface of the hole of the bearing housing 4.

In case the rotary structure of this construction is to be used as a spindle unit, the bearing housing 4 is fixed and the shaft 1 is provided at its lower part with a pulley 7 and at its upper part with a rotor 6 such as a pulley, disc or turntable.

In assembling, first of all, the sleeve 5 is fixed, for example by pressing, substantially in the middle within the bearing housing 4, the shaft 1 is inserted through the sleeve 5, a proper number of the balls 2 on the upper or lower side are put into the corresponding ball receiving part 1a and grease or oil is poured into the part. Then, the outer race 3 to be positioned on the opening side is put in from the opening of the bearing housing 4 to press the balls 2 with the tapered surface 3a, against the inside recessed step part of the ball receiving part 3a and this outer race 3 is fixed in a proper position on the inner peripheral surface of the bearing housing 4. Then, the balls and outer race 3 on the other side are put in in the same manner and the upper and lower rotor 6 and pulley 7 may be fixed to the respective ends of the shaft 1. By the way, in the above mentioned assembling step, before the upper and lower rotor 6 and pulley 7 are fixed, the rotation precision of the shaft 1 can be confirmed and, by finely adjusting the position of the outer race 3, the clearance with the balls 2 can be easily adjusted and a favorable rotation performance can be obtained. In use, the inner peripheral surface 3b of the outer race 3 is so close to the outer peripheral surface 1b of the shaft 1 that, the dust preventing clearance g forms a fine gap, such that entry of dust or the like into the ball part can be restricted to a minimum.

Figure 2:
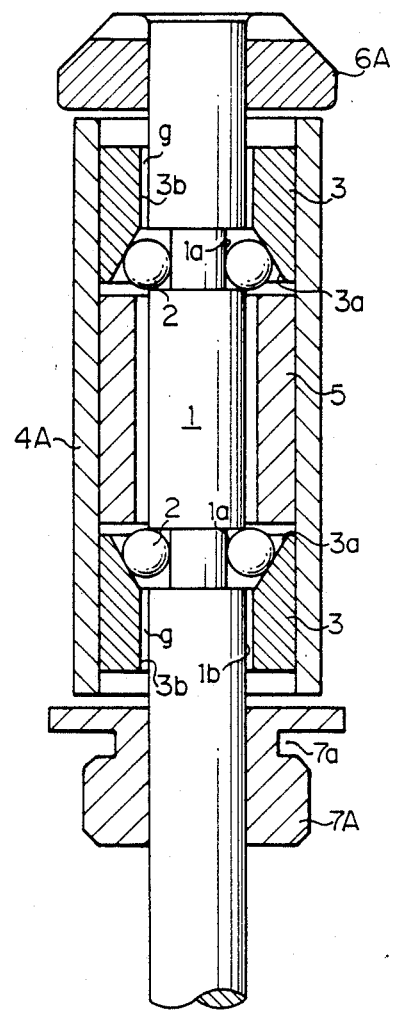
FIG. 2 shows the second embodiment of the present invention.

FIG. 2 of the second embodiment of the present invention is different from the first embodiment in that the shaft 1 is fixed and the bearing housing 4 is rotatable with respect to the shaft 1 so as to be able to be used, for example, as a tape guide roller. By the way, the shaft 1 is provided in the upper and lower parts respectively with flanges 6A and 7A. The other construction is the same as in the first embodiment, therefore the same members are represented respectively by the same reference numerals and shall not be explained in detail.

Figure 3:
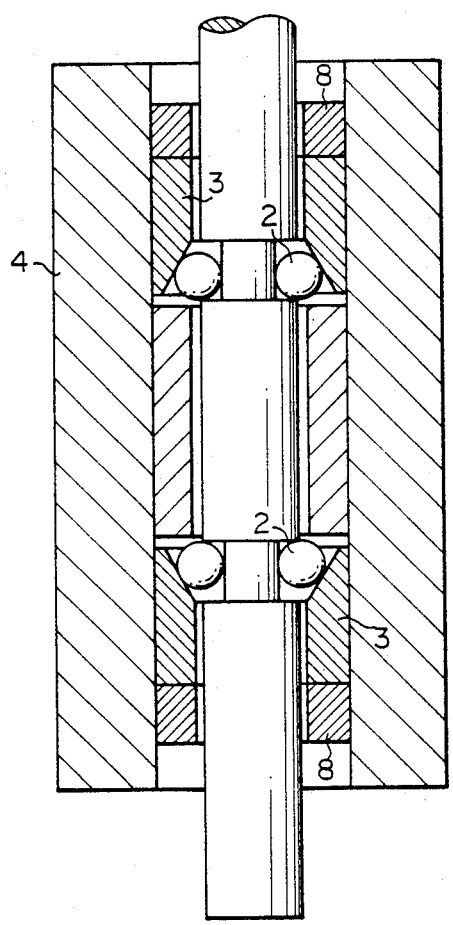
FIG. 3 shows the third embodiment of the present invention.

FIG. 3 shows the third embodiment of the present invention which is characterized in that the outer races 3 are not fixed but are made slidable on the inner peripheral surface of the bearing housing 4 and are fixed by outer race pressure 8 respectively provided outside the outer races and fixed to the inner peripheral surface of the bearing housing 4 and both or either of the upper and lower outer race pressers 8 is made of an elastic member such rubber so as to supply a prepressure to the outer race 3 in contact with the balls 2 to prevent a backlash from being caused by the abrasion of the ball rolling surface.

The other elements are the same as in the first and second embodiments.

Figure 4:
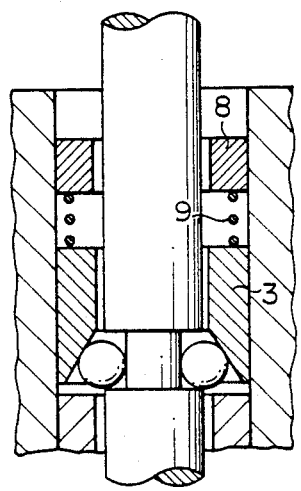
FIG. 4 shows the fourth embodiment of the present invention.

FIG. 4 shows the fourth embodiment of the present invention in which a resilient member as a spring 9 is provided between the outer race 3 and outer race presser 8 so as to apply a prepressure to the outer race 3.

Figure 5:
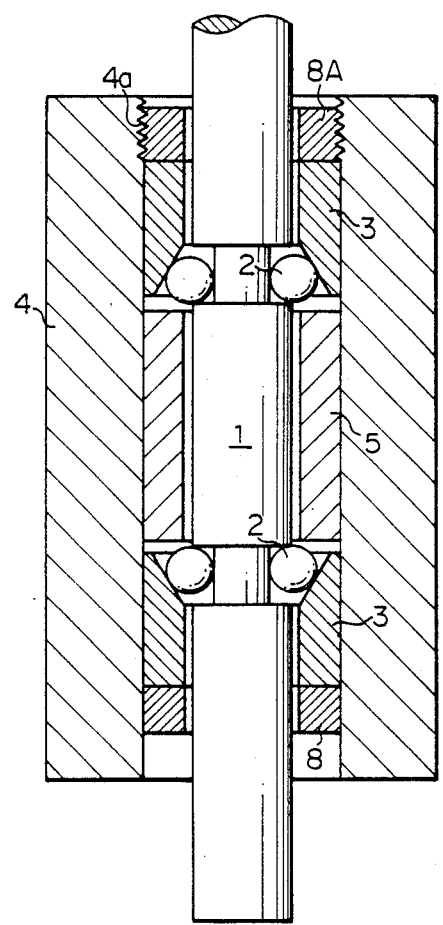
FIG. 5 shows the fifth embodiment of the present invention.

FIG. 5 shows the fifth embodiment of the present invention in which either of the outer race pressers is formed as an adjusting screw 8A engaged with threads formed on the inner peripheral surface of the bearing housing 4 so that, by adjusting screw 8A, the position of the outer race 3 may be adjusted and the clearance between the ball 2 and outer race 3 may be adjusted. The other outer race presser 8 is fixed to the bearing housing 4.

Figure 6:
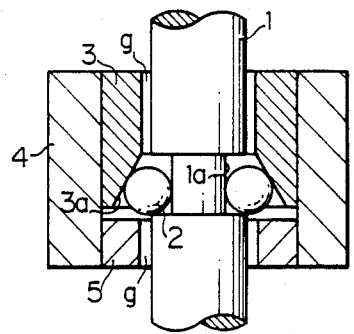
FIG. 6. shows the sixth embodiment of the present invention.

FIG. 6 shows the sixth embodiment of the present invention. In the first to fifth embodiments, the ball parts are provided at two places but, in the subsequent embodiments, the ball part is provided at only one place.

That is to say, ball receiving part 1a formed as a recessed groove rectangular in cross-section is provided on a part of the outer periphery of the columnar shaft 1 and the balls 2 are held against the inside recessed step part of this ball receiving part 1a by the tapered ball receiving surface 3a formed on the outer race 3 fixed to the inner peripheral surface of the bearing housing 4. A short cylindrical sleeve 5 fixed to the inner peripheral surface of the bearing housing 4 is provided near the balls 2 and the ball receiving surface 3a of the outer race 3. In this case, dust preventing clearances g are formed respectively between the inner peripheral surface of the outer race 3 and the outer peripheral surface of the shaft 1 and between the inner peripheral surface of the sleeve 5 and the outer peripheral surface of the shaft 1.

In assembling, the sleeve 5 is fixed within the bearing housing 4, then the shaft 1 is inserted into the bearing housing 4 and a proper number of the balls 2 are put in from the other side and are arranged in a proper position within the groove 1a. In this case, the balls 2 will be prevented by the sleeve 5 from escaping and dropping. Then, the outer race 3 may be put into the bearing housing 4 and fixed in a proper position. The other part of the shaft 1 may be supported as required by an ordinary radial ball bearing, plane bearing or pivot bearing.

Figure 7:
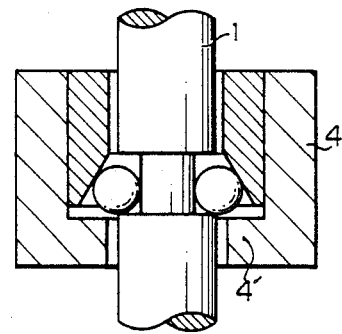
FIG. 7 shows the seventh embodiment of the present invention.
Figure 8:
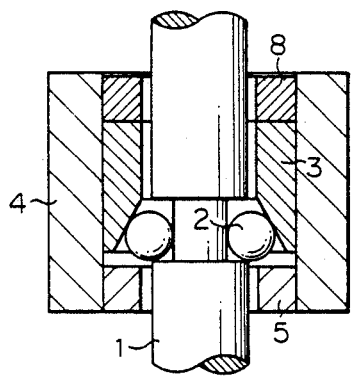
FIG. 8 shows the eighth embodiment of the present invention.

FIG. 7 shows the seventh embodiment of the present invention in which, in the sixth embodiment, the outer race 3 is loosely fitted within the bearing housing 4 and is fixed by the outer race presser 8 made of an elastic member and arranged outside the outer race 9 so as to apply a prepressure by the elasticity of the outer race presser and to prevent a backlash from being caused by the abrasion of the ball rolling surface. The other elements are the same as in the sixth embodiment.

Figure 9:
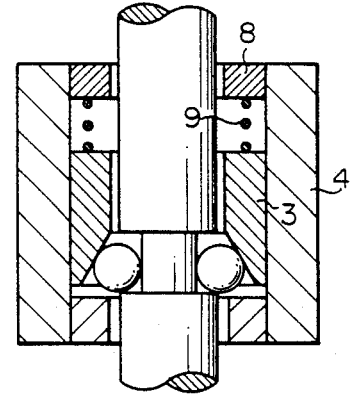
FIG. 9 shows the ninth embodiment of the present invention.

FIG. 9 shows the ninth embodiment of the present invention which is different from the eighth embodiment in that the outer end of the outer race 3 loosely fitted within the bearing housing 4 and the inner end of the outer race presser 8 fixed within the bearing housing 4 are separated from each other and a resilient member such as a spring is provided between them so as to apply a prepressure to the outer race 3. In this case, the outer race presser 8 need not be made specifically of an elastic material.

Figure 10:
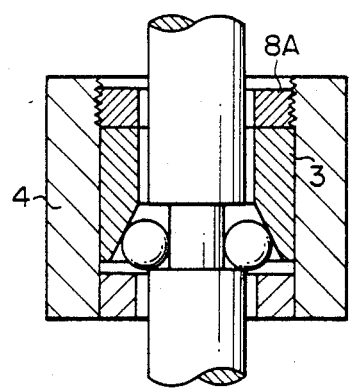
FIG. 10 shows the tenth embodiment of the present invention.

FIG. 10 shows the tenth embodiment of the present invention in which an outer race adjusting screw 8A is provided outside the outer race 3 on the inner periphery of the bearing housing 4 so as to be able to adjust the clearance.

Figure 11:
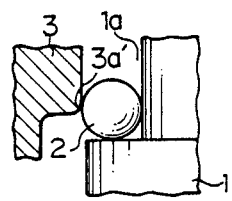
FIG. 11 shows the eleventh embodiment of the present invention.

FIG. 11 shows the eleventh embodiment of the present invention in which, without positively forming the tapered surface 3a in the outer race 3 as in the above described respective embodiments, a rounded corner part 3a' of the outer race 3 saves as a ball 2 rolling surface so as to contact and hold the balls 2 together with the ball receiving part 1a.

That is to say, the outer race 3 is so-called barrel-ground in its production and, in this step, the corner part will be somewhat rounded. Therefore, the balls 2 may be received by the rounded part. In such case, the outer race 3 need not be positively provided with the tapered part 3a, therefore will be made that much simpler in construction, will be easy to produce and will be able to be reduced in cost.

Figure 12:
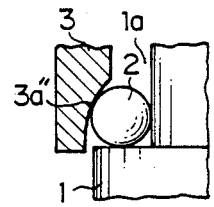
FIG. 12 shows the twelfth embodiment of the present invention.

FIG. 12 shows the twelfth embodiment, of the present invention which is different from the above described respective embodiments in that the ball 2 receiving part of the outer race 3 is made a rounded surface of a concave spherical surface 3a'' of a curvature larger than that of the ball 2 instead of as the tapered part. The other elements are the same.

Figure 13:
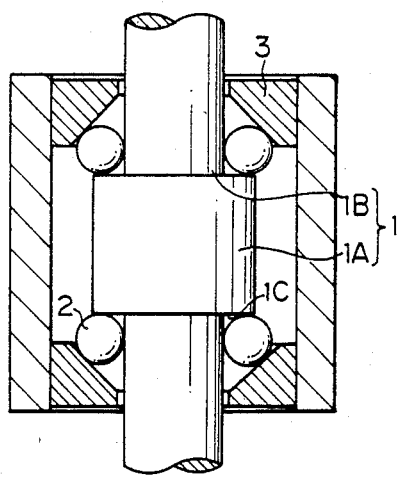
FIGS. 13 and 14 show the thirteenth and fourteenth embodiments of the present invention.

FIG. 13 shows the thirteenth embodiment of the present invention in which the shaft 1 consists of a middle large diameter part 1A and small diameter parts 1B on both sides of part 1A an angular recessed step part 1c serves as a ball receiving part so that the balls may be prevented by the large diameter part 1 from escaping and dropping in assembling, the sleeve 5 shown, for example, in the first embodiment is rendered unnecessary and the number of the component parts may be reduced. The other elements are the same as in the above described respective embodiments.

Figure 14:
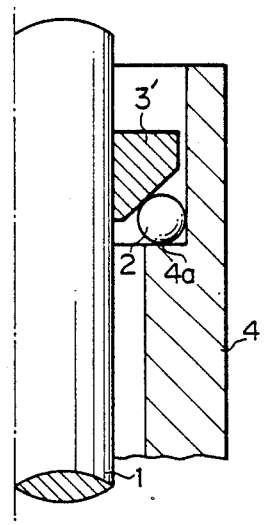
Figure 15:
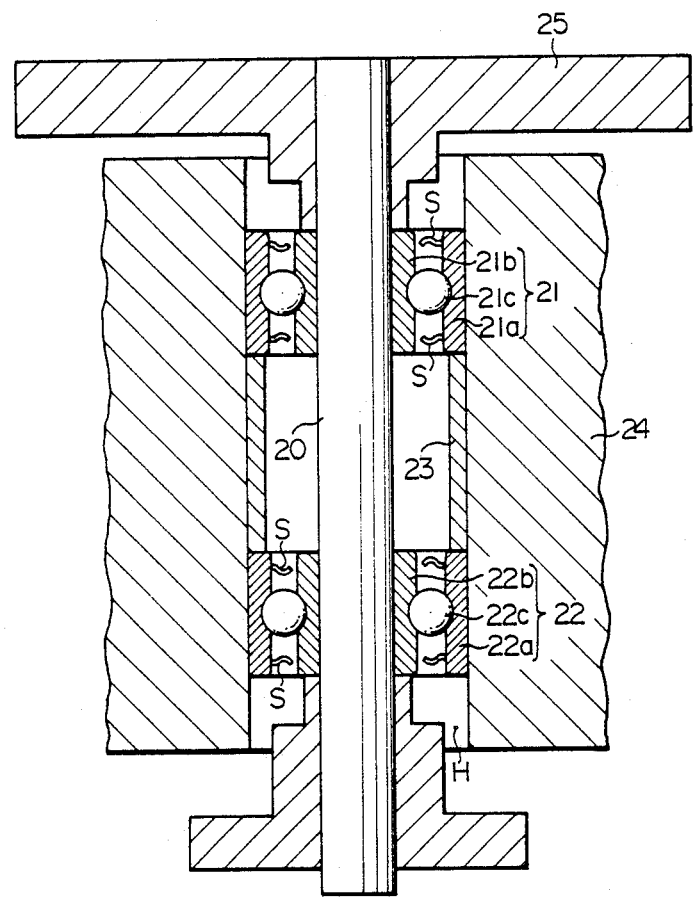
FIG. 15 shows a conventional example.

FIG. 14 shows the fourteenth embodiment of the present invention in which a recessed step part 4a is formed in a proper position on the inner peripheral surface of the bearing housing 4 and the shaft 1 is columnar so that the balls 2 may be held by a bearing race 3' fitted on the outer periphery of the shaft 1. The contact part of the bearing race 3' with the balls 2 may be made as a tapered surface or a rounded point or a rounded surface as in FIGS. 11 and 12.

The balls 2 arranged between the shaft 1 and bearing housing 4 in the above mentioned respective embodiments may be independent balls or may be secured at proper intervals by using a retainer or the like.

As in the above, according to the present invention, without using the conventional radial ball bearing, ball receiving parts consisting of recessed step parts are formed on a shaft and balls are held by and between this ball receiving part and a tapered surface or concave spherical surface of an outer race provided on the periphery of the shaft to form a rotary mechanism so that the minimum component parts around the shaft may be only the balls, outer races and, as required, the sleeve and bearing housing, the number of the component parts may be reduced to be fewer than before, the assembling may be easy and the cost may be reduced.

In the structure, the balls are partly housed in the recessed step parts for receiving the balls of the shaft so that the structure may be made small and light.

If the outer contour is made the same as of the conventional structure, the ball diameter can be made that much larger and the rigidity can be improved.

Also, in the conventional radial ball bearing, in order to have some width of the clearance between the inner race and outer race for the diameter of the ball, the dimensions of the outside diameter of the inner race and inside diameter of the outer race had be be measured to have a combination keeping a proper clearance. However, in the present invention, by only finely adjusting the position of the outer race, the clearance can be easily adjusted.

Also, by adjusting the position of the outer race as displaced, the ball diameter can be made that much larger. In this respect, too, the rigidity can be improved.

What is claimed is:

1. A rotary structure comprising a columnar shaft having a cylindrical outer periphery, a housing surrounding said outer periphery of said shaft, said shaft and housing being relatively rotatable, said shaft having recessed annular step parts formed directly in said outer periphery, a plurality of balls partially received and supported in said step parts of said shaft and projecting beyond the outer periphery of said shaft, and an outer race surrounding the outer periphery of said shaft and having a tapered surface in contact with said balls to apply pressure to said balls and urge the balls against said recessed annular step parts to rollably hold the balls in said step parts, said housing surrounding said outer race and having an inner peripheral surface to which said outer race is fixed.

2. A rotary structure as claimed in claim 1 wherein said recessed annular step parts in said outer periphery of the shaft is constituted by an annular groove of rectangular cross-section in said shaft, said tapered surface of said race being part spherical and widening in a direction facing the annular step parts against which the balls are pressed, said annular step parts having surfaces at right angles to one another, said part spherical surface of the race contacting said balls to hold the same against the right angle surfaces of the annular step parts.

3. A rotary structure as claimed in claim 1 wherein said tapered surface is conical.

4. A rotary structure as claimed in claim 1 wherein said tapered surface is part spherical.

5. A rotary structure as claimed in claim 4 wherein said tapered surface widens in a direction facing the annular step parts against which the balls are pressed.

6. A rotary structure as claimed in claim 4 comprising a sleeve fixed to said inner periphery of said housing and surrounding said shaft with clearance, said sleeve having an end facing said outer race and said balls in spaced relation proximate said annular step parts for retaining said balls in said step parts during assembly.

7. A rotary structure as claimed in claim 4 wherein said shaft and said outer race form a small gap therebetween constituting a means for preventing dust passage therethrough.

8. A rotary structure as claimed in claim 4 wherein said annular step parts in said shaft extend at right angles to form a right-angle step.

9. A rotary structure as claimed in claim 8 wherein said tapered surface on said outer race contacts said balls along tangential lines of contact which form an angle with said step parts of said right-angle step.

10. A rotary structure as claimed in claim 1 comprising means for applying adjustable pressure against said balls thereby to adjust the pressure of the balls against said recessed annular step parts.

11. A rotary structure as claimed in claim 10 wherein said outer race is made of elastic material to form said means for applying adjustable pressure.

12. A rotary structure as claimed in claim 10 wherein said means for applying adjustable pressure comprises a spring and a presser member secured to said housing, said spring being engaged between said outer race and said presser member.

13. A rotary structure as claimed in claim 10 wherein said means for applying adjustable pressure comprises a threaded presser member threadably engaged in said housing and bearing against said outer race.

14. A rotary structure comprising a columnar shaft having a cylindrical outer periphery, a housing surrounding said outer periphery of said shaft, said shaft and housing being relatively rotatable, said shaft having two recessed annular step parts formed directly in said outer periphery of said shaft in axially spaced relation, a plurality of balls partially received and supported in said two stepped parts and projecting beyond the outer periphery of the shaft, and an outer race surrounding each of the step parts in the shaft and having a tapered surface in contact with the balls projecting from the respective step part to apply pressure to said balls and urge the balls against said recessed annular step part to rollably hold the balls in said step part, and a sleeve fixed to said inner periphery of said housing and having opposite ends proximate said two annular step parts and each facing a respective outer race and associated balls in spaced relation, said sleeve surrounding said shaft with clearance.

15. A rotary structure as claimed in claim 14 wherein each of said recessed annular step parts in said outer periphery of the shaft is constituted by an annular groove of rectangular cross section in said shaft, said tapered surface of each race being part spherical and widening in a direction facing the respective annular step parts against which the balls are pressed, said annular step parts of the respective races having surfaces at right angles to one another, said part spherical surface of each race contacting the associated balls to hold the same against the right angle surfaces of the associated annular step parts.

16. A rotary structure comprising a columnar shaft having a cylindrical outer periphery, a housing surrounding said outer periphery of said shaft, said shaft and housing being relatively rotatable, said shaft having two recessed annular step parts formed directly in said outer periphery of said shaft in axially spaced relation, a plurality of balls partially received and supported in each of said two stepped parts and projecting beyond the outer periphery of the shaft, an outer race surrounding each of said step parts and having a tapered surface in contact with the balls projecting from the respective step part to apply pressure to said balls and urge the balls against said recessed annular step part to rollably hold the balls in said step part, a sleeve fixed to said inner periphery of said housing and having opposite ends proximate said two annular step parts and each facing a respective outer race and associated balls in spaced relation, said sleeve surrounding said shaft with clearance, said tapered surfaces widening in a direction towards said sleeve, said shaft having opposite ends projecting from said housing and rotor means outside said housing on each of said ends of the shaft.

17. A rotary structure as claimed in claim 17 wherein said annular step parts in said shaft extend at right angles to form a right-angle step, said tapered surface of each outer race being in contact with the balls in the associated annular step part to urge the balls towards the right-angle step.

* * * * *